2 Sheets—Sheet 1.

C. H. ORCUTT.
Button-Lathe.

No. 214,580. Patented April 22, 1879.

Witnesses.

Inventor.
Charles H. Orcutt.
by attorney.

2 Sheets—Sheet 2.

C. H. ORCUTT.
Button-Lathe.

No. 214,580.  Patented April 22, 1879.

Witnesses
S. N. Piper
W. W. Lunt

Inventor.
Charles H. Orcutt.
by attorney.

UNITED STATES PATENT OFFICE.

CHARLES H. ORCUTT, OF LEOMINSTER, MASSACHUSETTS.

IMPROVEMENT IN BUTTON-LATHES.

Specification forming part of Letters Patent No. 214,580, dated April 22, 1879; application filed February 10, 1879.

*To all whom it may concern:*

Be it known that I, CHARLES H. ORCUTT, of Leominster, in the county of Worcester and State of Massachusetts, have invented a new and useful Improvement in Button-Lathes; and do hereby declare the same to be described in the following specification and represented in the accompanying drawings, of which—

Figure 1:
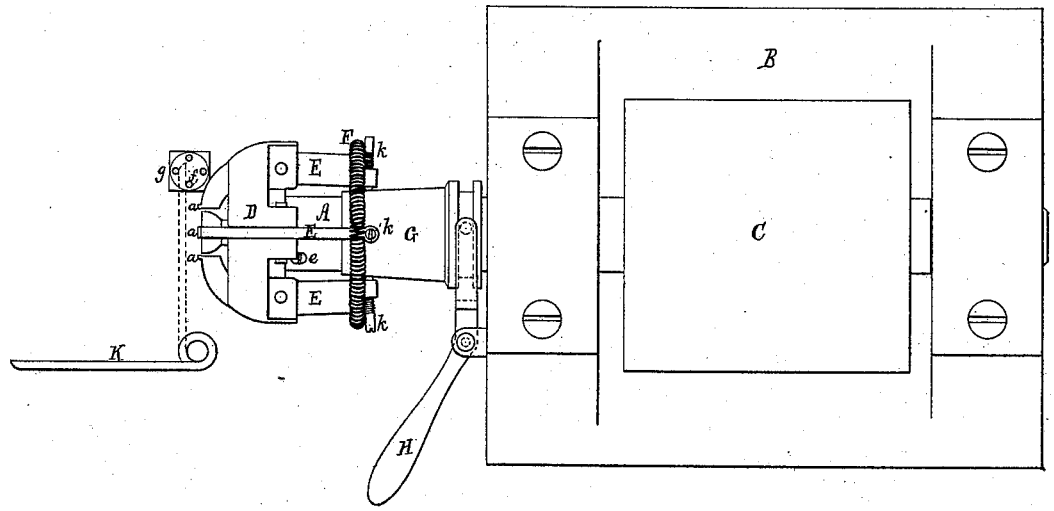
Figure 3:
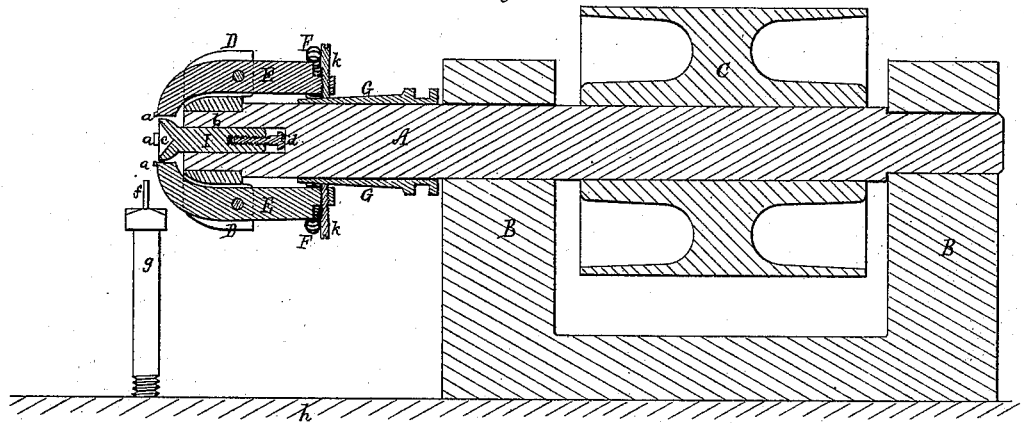
Figure 2:
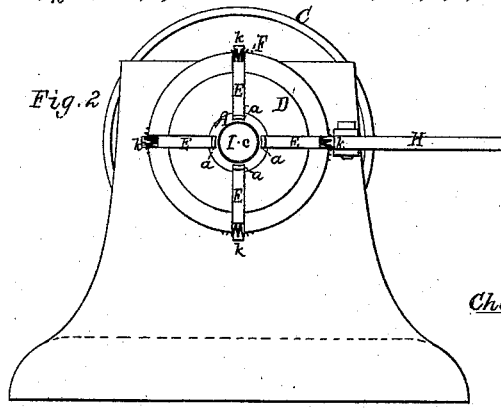
Figure 4:
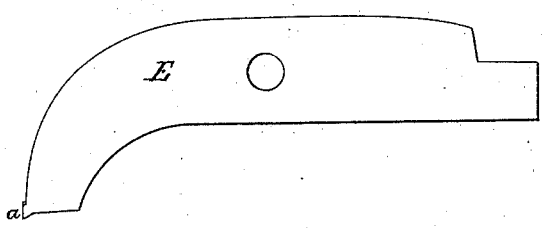

Figure 1 is a top view, Fig. 2 a front-end elevation, and Fig. 3 a longitudinal section, of a lathe containing my said invention, the nature of which is fully set forth in the claim or claims hereinafter presented. Fig. 4 is a side view, Fig. 6 a bottom view, and Fig. 5 a front-end view, on an enlarged scale, of the front portion of one of the jaws, such drawings showing the form of the angular tooth of the jaw.

The lathe shown in the said drawings is to enable a person to turn a button or other like article from a short cylindrical blank of horn or other suitable material, such blank, while being turned or converted into a button of the right shape, (such usually being like a double convex lens,) being grasped by and held between the teeth of the jaws and against an abutment inserted in the arbor of the lathe. This arbor is shown at A as duly supported in a head-stock, B, and provided with a driving-pulley, C. There is to such arbor a head, D, which is recessed to receive, and has pivoted to it, a series of four jaws or levers, E, arranged as shown. Each of such jaws, at its outer end, terminates in a slightly-truncated angular tooth, $a$. The longer arms of these jaw-levers are encompassed by an endless-band helical spring, F, by which the screws of all the arms are drawn closely against a tubular conic frustum, G, that encompasses and slides freely on the arbor, and is grooved transversely to receive the end of a lever, H, arranged with and applied to it as shown, such lever being for moving the frustum endwise on the arbor, either to close the jaws or move their teeth toward each other, or to allow the spring to operate to open them or move them in opposite directions.

The tooth $a$ to each jaw is acute-angular in its transverse section or in end view, as shown in Fig. 4. It is also, as in Fig. 5, concave lengthwise at its apex, the curve at one terminus of it making an acute angle with the next adjacent side of the jaw, while at its other extremity the curve makes a greater angle with the next adjacent side of the jaw, the two sides of the jaw being supposed to be parallel. The bearing part of the tooth is not a sharp edge, but should be slightly flattened, in order that it may not cut into the blank.

From the above it will be seen that the tooth is a slightly-truncated acute angle in transverse section, and that its bearing-edge is curved, and a little oblique as to either side of the jaw, such causing the tooth to bear more at one end on the blank than the other, such operating to prevent the blank, while being cut, from slipping around on the tooth.

The arbor, at its front end, has a cylindrical socket, $b$, made axially within it, to receive the cylindrical shank of a bolt or adjustable abutment, I, which, at its front end, has a concavity or recess, $c$, made therein. This abutment is to support the blank in its proper relation to the teeth of the jaws under the pressure of a tool while the blank may be in the act of being turned. The shank is movable endwise in the arbor, and at its rear end such blank has a regulating-screw, $d$, screwed therein. This screw answers the purpose of an adjustable stop, to regulate the position of the abutment relatively to the jaw-teeth, a set-screw, $e$, screwed into the arbor and against the shank of the abutment, serving to clamp such abutment in place.

The tool-rest K is pivoted at one end, so as to turn horizontally in the sector of a circle toward and away from the teeth of the jaws, and up to an adjustable stop or stud, $f$, projecting up from and arranged eccentrically in the head of a screw, $g$, screwed tightly down into the base $h$, on which the head-stock is fixed. By means of the screw $g$ the stud $f$ may be moved or adjusted so as to estop the tool-rest nearer to or farther from the jaw-teeth, as occasion may require.

The blank, while being turned, rests against the abutment, and is grasped by the teeth of the jaws. After it may have been turned convex on one side, the blank should be reversed, so as to bring the convexity within the concavity of the abutment; and while so situated and held by the jaws the blank is to be turned on its opposite face and converted into a button, except in having the usual thread-holes made in it or an eye fixed to it.

The tail of each lever-jaw has a screw, $k$, screwed tightly into and through it, and also against the frustum, as shown. These screws are to adapt the jaws for the reception of blanks of different diameters, as occasion may require.

In practice, the above-described lathe has been found to be highly useful for its intended purpose.

I am aware of the lathe-chuck described and shown in the United States Patent No. 43,512, which has some, though by no means all, of the elements or essential requisites of my invention. In the first place, it has nothing like the band-spring F to automatically open the jaws; second, it has no regulating-screw to its adjustable abutment, but in place thereof has a spring, which is liable to give way under pressure of the abutment, whereas the screw not only enables the abutment to be adjusted properly to the jaw, but is absolutely certain to sustain the abutment in position. The spring, therefore, is not an equivalent for the screw. Furthermore, the patented lathe has the old and common tool-rest, which has no adjustable stop like mine, and cannot be manipulated and turned back from and brought into position in front of the jaws and abutment, as can the tool-rest hereinbefore described.

I claim as my invention—

Figure 5:
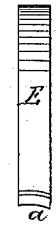
Figure 6:
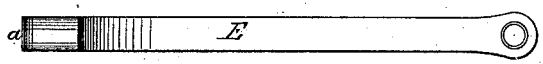

1. Each jaw provided with the angular tooth at its end, constructed forward, as represented in Figs. 4 and 5, as acute-angular and slightly truncated in transverse section, and obliquely curved at its apex, all being substantially as described.

2. The combination of the series of jaw-levers and their adjusting-screws with the arbor, the abutment, and the frustum G and endless-band spring F, all being substantially as set forth.

CHARLES H. ORCUTT.

Witnesses:
R. H. EDDY,
W. W. LUNT.